US009858952B1

(12) United States Patent
Sato et al.

(10) Patent No.: US 9,858,952 B1
(45) Date of Patent: Jan. 2, 2018

(54) MICROWAVE ASSISTED MAGNETIC RECORDING HEAD HAVING SPIN TORQUE OSCILLATOR FREQUENCY DETECTION

(71) Applicant: HGST Netherlands B.V., Amsterdam (NL)

(72) Inventors: Masashige Sato, Atsugi (JP); Susumu Okamura, Fujisawa (JP); Yo Sato, Odawara (JP); Keiichi Nagasaka, Isehara (JP)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 15/199,833

(22) Filed: Jun. 30, 2016

(51) Int. Cl.
G11B 5/39 (2006.01)

(52) U.S. Cl.
CPC ................... *G11B 5/3912* (2013.01)

(58) Field of Classification Search
CPC .................. G11B 5/127; G11B 5/40
USPC .......................... 360/125.3–125.33
See application file for complete search history.

(56) References Cited

U.S. PATENT DOCUMENTS

| 8,174,798 | B2 | 5/2012 | Nagasawa et al. | |
|---|---|---|---|---|
| 8,320,080 | B1* | 11/2012 | Braganca | G01R 33/098 360/125.3 |
| 8,379,352 | B1 | 2/2013 | Braganca et al. | |
| 8,687,319 | B2* | 4/2014 | Igarashi | G11B 5/1278 360/125.03 |
| 8,917,465 | B1 | 12/2014 | Contreras et al. | |
| 9,001,444 | B1 | 4/2015 | Contreras et al. | |
| 9,099,123 | B1* | 8/2015 | Wagatsuma | G11B 5/3909 |
| 9,568,564 | B2* | 2/2017 | Ma | G01R 33/02 |
| 2010/0079919 | A1* | 4/2010 | Nagasawa | B82Y 25/00 360/324.1 |
| 2012/0100810 | A1* | 4/2012 | Oksanen | H01F 10/3254 455/67.11 |
| 2013/0069262 | A1 | 3/2013 | Mulwa et al. | |
| 2013/0069626 | A1 | 3/2013 | Zhou et al. | |
| 2013/0107395 | A1* | 5/2013 | Nagasawa | G01R 33/093 360/75 |
| 2013/0329316 | A1* | 12/2013 | Watanabe | G11B 5/314 360/78.04 |
| 2014/0226239 | A1* | 8/2014 | Mihajlovic | H01L 43/06 360/112 |
| 2014/0376129 | A1* | 12/2014 | Kudo | G11B 5/35 360/125.3 |
| 2016/0218728 | A1* | 7/2016 | Zhu | G11B 5/3146 |

OTHER PUBLICATIONS

U.S. Appl. No. 15/059,239, filed Mar. 2, 2016.
(Continued)

*Primary Examiner* — Allen T Cao
(74) *Attorney, Agent, or Firm* — Foley & Lardner LLP

(57) ABSTRACT

A magnetic write head having a spin torque oscillator with a magnetic field sensor for accurately determining magnetic field oscillation frequency. The spin torque oscillator has one or more tunnel junction (TMR) sensors formed at the side of the spin torque oscillator. The TMR sensor advantageously detects a magnetic field signal that is an additive signal of both fields from the spin polarization layer and the magnetic field generation layer, thereby providing efficient detection of magnetic field and associated oscillation frequency.

20 Claims, 7 Drawing Sheets

(56) References Cited

OTHER PUBLICATIONS

Okamoto, "Magnetization switching behavior with microwave assistance," Applied Physics Letter, vol. 93, Jun. 6, 2008, 3 pages.
Watanabe et. al, "Oscillation Stability of a Small Size Spin Torque Oscillator for MAMR," IEEE Transactions on Magnetics, vol. 49, No. 7, pp. 3628-3631, Jul. 2013.
Zhang et. al, "Analysis of Switchable Spin Torque Oscillator for Microwave Assisted Magnetic Recording," Advances in condensed Matter Physics, vol. 2015, pp. 1-7, Mar. 2015.
Igarashi et. al, "Oscillation Feature of Planar Spin-Torque Oscillator for Microwave-Assisted Magnetic Recording," IEEE Transactions on Magnetics, vol. 46, No. 10, pp. 3738-3741, Oct. 2010.

* cited by examiner

MICROWAVE ASSISTED MAGNETIC RECORDING HEAD HAVING SPIN TORQUE OSCILLATOR FREQUENCY DETECTION

FIELD OF THE INVENTION

The present invention relates to magnetic data recording, and more particularly to a magnetic write head having a magnetic spin torque oscillator located between a magnetic write pole and a magnetic trailing shield and having a structure for detecting the magnetic oscillation frequency of the spin torque oscillator.

BACKGROUND

At the heart of a computer is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected tracks on the rotating disk. The read and write heads are directly located on a slider that has an air bearing surface (ABS). The suspension arm biases the slider into contact with the surface of the disk when the disk is not rotating, but when the disk rotates air is swirled by the rotating disk. When the slider rides on the air bearing, the write and read heads are employed for writing magnetic impressions to and reading magnetic impressions from the rotating disk. The write and read heads are connected to processing circuitry that operates according to a computer program to implement the writing and reading functions.

The write head includes at least one coil, a write pole and one or more return poles. When current flows through the coil, a resulting magnetic field causes a magnetic flux to flow through the coil, which results in a magnetic write field emitting from the tip of the write pole. This magnetic field is sufficiently strong that it locally magnetizes a portion of the adjacent magnetic media, thereby recording a bit of data. The write field then, travels through a magnetically soft under-layer of the magnetic medium to return to the return pole of the write head.

A magnetoresistive sensor such as a Giant Magnetoresistive (GMR) sensor, a Tunnel Junction Magnetoresistive (TMR) sensor or a scissor type magnetoresistive sensor can be employed to read a magnetic signal from the magnetic media. The magnetoresistive sensor has an electrical resistance that changes in response to an external magnetic field. This change in electrical resistance can be detected by processing circuitry in order to read magnetic data from the magnetic media.

SUMMARY

The present invention provides a magnetic write head for microwave assisted magnetic recording. The magnetic write head includes a spin torque oscillator having a leading edge, a trailing edge and a side extending from the leading edge to the trailing edge. The write head also includes a magnetic sensor formed at the side of the spin torque oscillator.

The magnetic sensor formed at the side of the spin torque oscillator advantageously detects magnetic field from the spin torque oscillator in order to accurately determine the oscillation frequency of the oscillating magnetic field produced by the spin torque oscillator.

The spin torque oscillator can be formed with a magnetic spin polarization layer, a magnetic field generation layer, and a non-magnetic interlayer located between the spin polarization layer and the magnetic field generation layer. The magnetic sensor formed at the side of the spin torque oscillator advantageously detects magnetic field from both the magnetic field generation layer and also the magnetic spin polarization layer and does so in an additive manner to produce a strong signal for accurately determining the magnetic oscillation frequency of the field generated by the spin torque oscillator.

The magnetic sensor formed at the side of the spin torque oscillator can be in the form of a tunnel junction sensor, including a non-magnetic barrier layer such as Mg—O formed at the side of the spin torque oscillator, a magnetic layer such as Co—Fe—B formed on the non-magnetic barrier layer, and an electrically conductive lead layer formed on the magnetic layer.

These and other features and advantages of the invention will be apparent upon reading of the following detailed description of the embodiments taken in conjunction with the figures in which like reference numeral indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION

The following description is of the best embodiments presently contemplated for carrying out this invention. This description is made for the purpose of illustrating the general principles of this invention and is not meant to limit the inventive concepts claimed herein.

Figure 1:
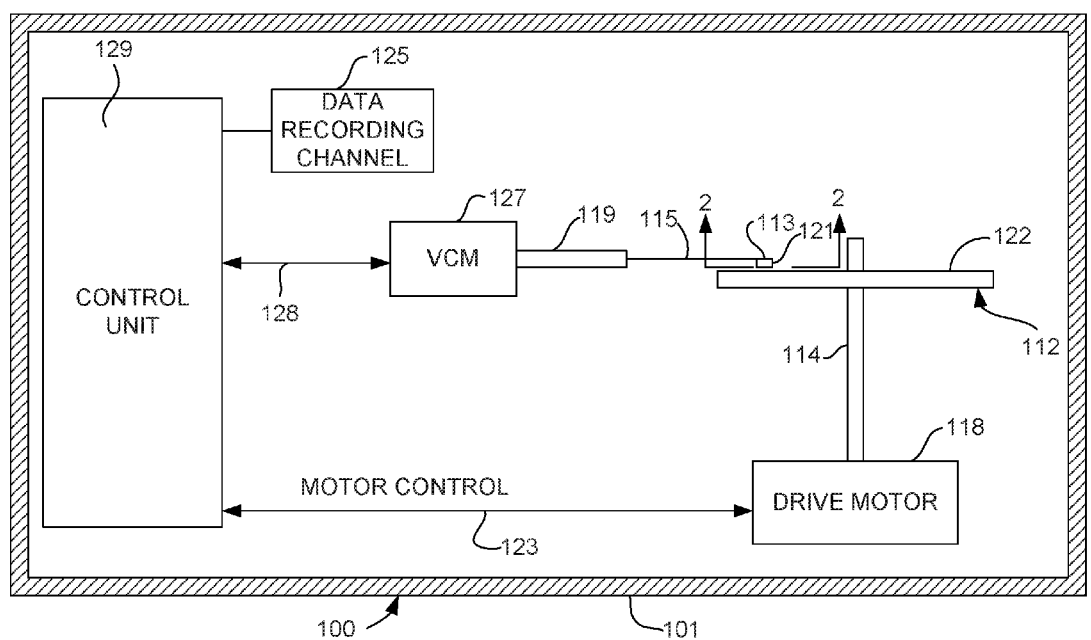
FIG. 1 is a schematic illustration of a disk drive system in which the invention might be embodied.

Referring now to FIG. 1, there is shown a disk drive 100. The disk drive 100 includes a housing 101. At least one rotatable magnetic disk 112 is supported on a spindle 114 and rotated by a disk drive motor 118. The magnetic recording on each disk may be in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves in and out over the disk surface 122 so that the magnetic head assembly 121 can access different tracks of the magnetic disk where desired data are written. Each slider 113 is attached to an actuator arm 119 by way of a suspension 115. The suspension 115 provides a slight spring force which biases the slider 113 against the disk surface 122.

Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by the controller 129.

During operation of the disk storage system, the rotation of the magnetic disk 112 generates an air bearing between the slider 113 and the disk surface 122, which exerts an upward force or lift on the slider. The air bearing thus counter-balances the slight spring force of the suspension 115 and supports the slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, and a microprocessor. The control unit 129 generates control signals to control various system operations such as drive motor control signals on line 123 and head position and seek control signals on line 128. The control signals on line 128 provide the desired current profiles to optimally move and position the slider 113 to the desired data track on the media 112. Write and read signals are communicated to and from write and read heads 121 by way of recording channel 125.

Figure 2:
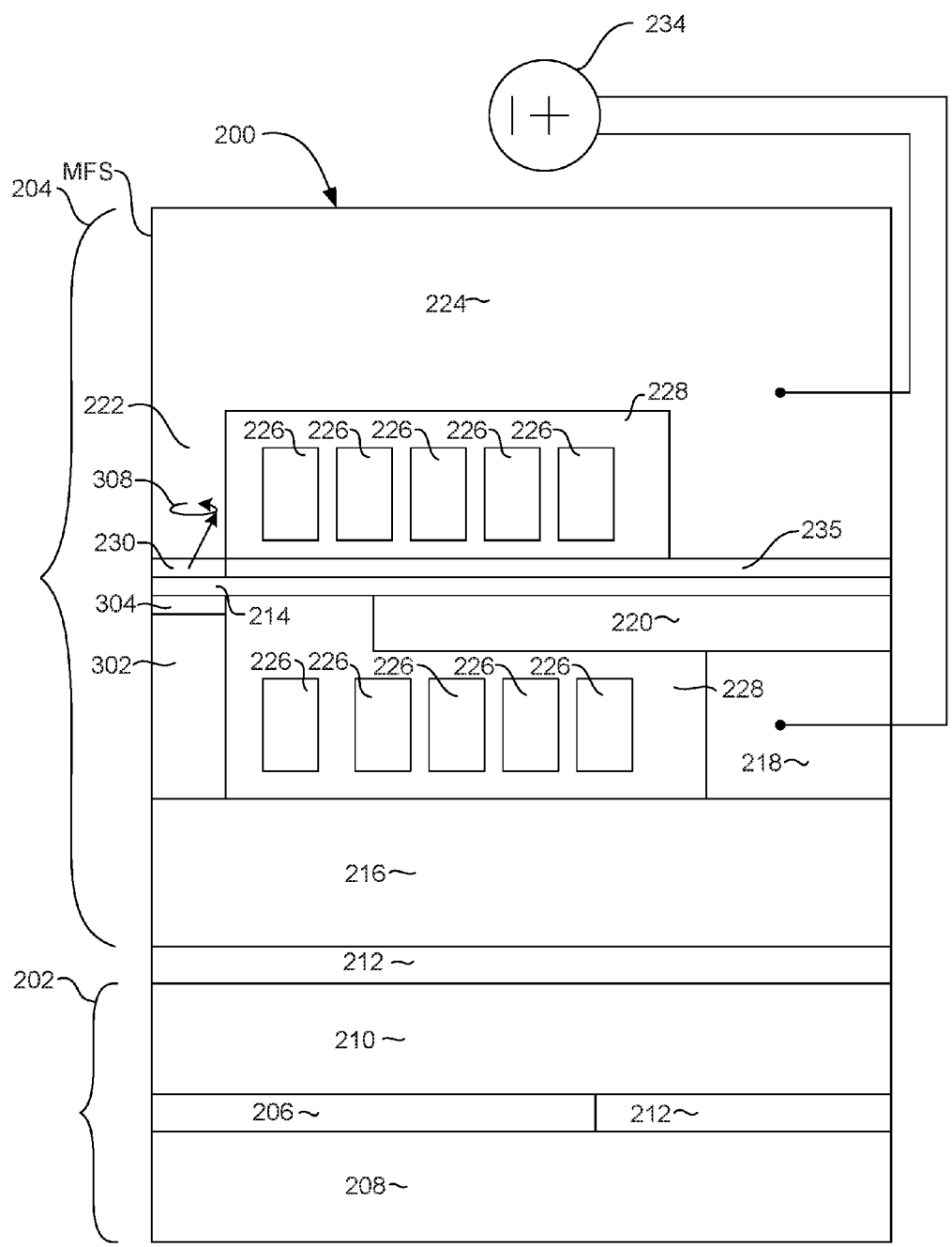
FIG. 2 is side, cross-sectional, schematic view of a magnetic read write head.

With reference to FIG. 2, a magnetic read/write head 200 can include a read head 202 and a write head 204. The read head 202 can include a read sensor 206 such as a giant magnetoresistive sensor or tunnel junction sensor, which can be sandwiched between first and second magnetic shields 208, 210. The space between the read and write heads 202, 204 can be filled with a non-magnetic, electrically insulating material 212, as can the space behind the sensor 206 between the shields 208, 210.

The write head 204 can include a magnetic write pole 214 and a magnetic return pole 216, both of which can extend to a media facing surface MFS. The magnetic return pole 216 can be connected with the magnetic write pole 214 by a magnetic back gap layer 218 and a magnetic shaping layer 220. The magnetic shaping layer 220 helps to channel magnetic flux to the tip of the magnetic write pole 214. The write head 204 can also include a trailing magnetic shield 222 formed near the trailing edge of the write pole 214 at the media facing surface MFS. The trailing magnetic shield 222 can be connected with the back portion of the write head 204 by a trailing magnetic return pole 224.

The write head 204 also includes a non-magnetic, electrically conductive write coil 226 (shown in cross section in FIG. 2) that can pass above and below the write pole 214. The write coil 226 can be embedded in a non-magnetic, electrically insulating material such as alumina 228. When an electrical current flows through the write coils 226, a magnetic field is generated. This causes a magnetic flux to flow through the write pole 214. The resulting write field travels from the tip of the write pole 214 to a magnetic media (not shown in FIG. 2) and then travels back through the return pole 216. Because the return pole 216 has a larger cross section at the media facing surface MFS than does the write pole 214, the return of the magnetic write field to the return pole 216 does not erase the previously recorded bit of data.

As demands for increased data density require ever smaller magnetic bit sizes, the magnetic bits recorded to a recording media become inherently, magnetically unstable. In order to make the recorded magnetic bits more stable, the magnetic media can be designed to have an increased magnetic anisotropy, and or magnetic coercivity. This however makes the media harder to record to, especially with the smaller write pole required to record the smaller magnetic bit.

One way to overcome this challenge is to generate an oscillating magnetic field just at or adjacent to the location of the write pole. This oscillating magnetic field temporarily reduces the magnetic anisotropy of the magnetic media, making it easier to record to. To this end, as shown in FIG. 2 a magnetic oscillator such as a spin torque oscillator 230 can be employed. The spin torque oscillator 230 can be located between the write pole 214 and the trailing magnetic shield 222. The spin torque oscillator 230 generates an oscillating magnetic field that moves in a precessional manner as indicated by arrow 308.

A current source 234 can be provided to supply an electrical current to flow through the spin torque oscillator 230. The current source 234 can be connected with the magnetic write head 204 so that current flows between the write pole 214 and the trailing shield 222 through the spin torque oscillator 230. This current causes the spin torque oscillator to generate the oscillating magnetic field 308. An electrically insulating layer 235 can be provided at the back of the write head 204 to prevent this electrical current from being shunted through the back portion of the write head 204.

Figure 3:
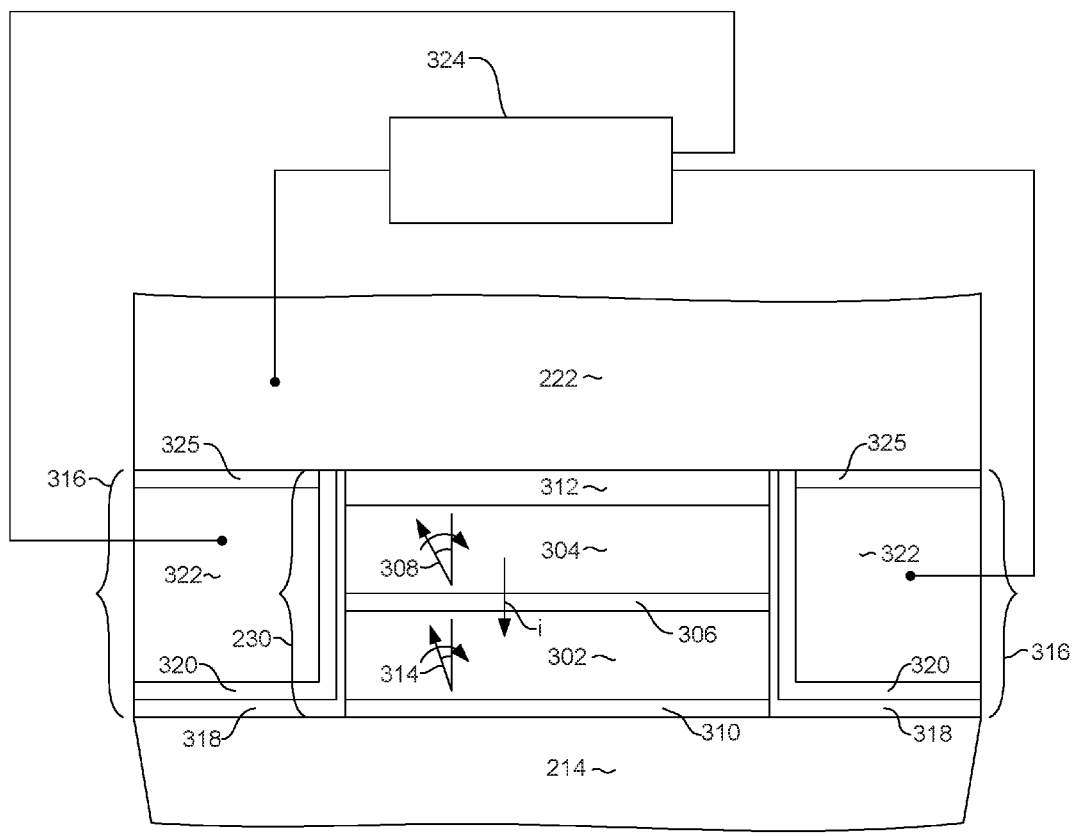
FIG. 3 is an enlarged view of a spin torque oscillator structure for use with the write head of FIG. 2, as seen from the media facing surface.

FIG. 3 shows an enlarged view of the spin torque oscillator 230 according to one embodiment. The spin torque oscillator 230 includes two magnetic layers 302, 304 separated by a non-magnetic interlayer 306 located between the magnetic layers 302, 304. The first magnetic layer 302 is a spin polarization layer, and the second magnetic layer 304 is a magnetic field generation layer. When a current flows through the spin torque oscillator as indicated by arrow i, in a direction perpendicular to the layers 302, 304, 306, the electrons flowing through the spin polarization layer 302 become spin polarized due to the magnetization of the spin polarization layer 302. When these spin polarized electrons flow from the spin polarization layer 302, through the interlayer 306 to the field generation layer 304, they impart a spin torque on the field generation layer 304. This spin torque causes the magnetization of the field generation layer 304 to oscillate as indicated by arrow 308. The magnetic oscillation 308 of the field generation layer 304 can impart an oscillation 314 in the spin polarization layer 302 as a result of magnetostatic coupling between the magnetic layers 302, 304. In addition to the layers 302, 304, 306, the spin torque oscillator 230 may also include a seed layer 310 to promote a desired grain structure in the above formed layers 302, 304, 306 and may also include a capping layer 312 at the end opposite the seed layer 310.

An important design parameter for magnetic recording systems that employ spin torque oscillators is the frequency of the magnetic oscillation of the spin torque oscillation. A magnetic media has an optimal magnetic frequency oscillation range for promoting the writing of magnetic data to the magnetic media. Therefore, in order to maximize writing efficiency, the magnetic oscillation frequency of the spin torque oscillator is preferably matched to the magnetic media of the magnetic recording system.

However, previously there has not been an effective way to measure the oscillation frequency of the spin torque oscillator. Measuring the voltage across the spin torque oscillator in a direction perpendicular to the layers 302, 304, 306 does not provide an effective measure of the magnetic field oscillation frequency. This voltage change is a factor of the relative angles of the oscillations 308, 314 and they combine in a subtractive, rather than additive manner, resulting in a weak signal. Furthermore, use of a conventional field sensor, such as a sensor wire located adjacent to the spin torque oscillator 230 also fails to provide an effective measure of oscillation frequency. This is because spin torque oscillators operate at very high frequencies at which conventional magnetic field sensors saturate.

Therefore, in order to accommodate this long felt, but unmet need, the write head is provided with tunnel junction magnetic sensors 316 formed at the sides of (or behind the spin torque oscillator 230. The tunnel junction magnetic sensor 316 can be at one side, or can be at both sides of the sensor as shown. As shown in FIG. 3, the magnetic tunnel junction sensor 316 includes a non-magnetic barrier layer 318, a magnetic layer 320 and a non-magnetic, electrically conductive side lead 322. The side lead 322 is electrically insulated from the shield 222 by an electrically insulating layer 325, which may be a material such as alumina.

The non-magnetic barrier layer 318 can be a material such as Mg—O, and as shown in FIG. 3, the non-magnetic barrier layer 318 can be thicker over the write pole 214 and thinner along the side of the spin torque oscillator 230. The thicker barrier layer 214 over the write pole 214 will prevent current shunting to the write pole 214, and the barrier layer 318 should be thin enough along the side of the spin torque oscillator 230 to allow quantum tunneling of charge carriers there-through in a manner similar to a standard tunnel junction magnetic sensor as might be used to read a magnetic signal from a magnetic media. The magnetic layer 320 can be constructed of Co—Fe—B, and the side leads 322 can be constructed of an electrically conductive material such as Cu or Au.

As a result of spin tunneling of electrons through the barrier layer 318, the electrical resistance between the spin torque oscillator 230 and the lead 322 will vary depending upon the relative directions of magnetizations of the magnetic layers 302, 304 and the magnetic layer 320 of the tunnel junction sensor. Therefore, because the magnetization 308, 314 of the magnetic layers 302, 304 are oscillating as described above, the resistance across the barrier layer will 318 will vary with the magnetic oscillations 308, 314. What's more, this variation in electrical resistance will be additive for both the magnetic oscillations 314, 308. By measuring the electrical resistance between the spin torque oscillator 230 and the lead 322, the frequency of the oscillations 308, 314 can be efficiently and reliably measured. The lead 322 effectively forms a third electrical terminal, in addition to those provided by the write pole 214 and trailing shield 222. The lead 322 and either or both of the write pole 214 and/or trailing shield 222 can be connected with circuitry 324 that can apply a voltage between the spin torque oscillator 230 and the lead 322. The circuitry 324 can measure the change in resistance across the layers 318, 320 and can also determine the frequency of the electrical resistance change. Therefore, the frequency of magnetic oscillation produced by the spin torque oscillator 230 can be accurately measured.

Figure 4:
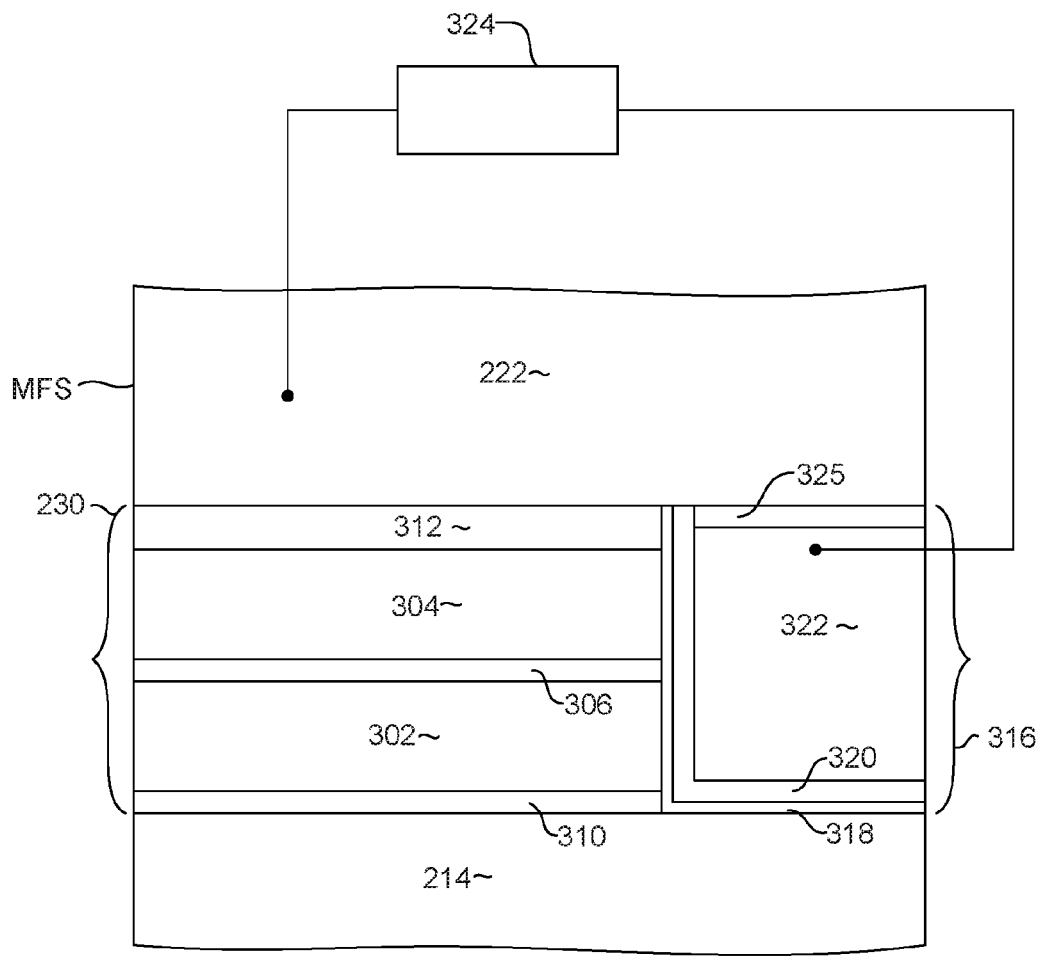
FIG. 4 is a side, cross sectional view of a spin torque oscillator for use with the magnetic read write head of FIG. 2 according to an alternate embodiment.

FIG. 4 illustrates an alternate embodiment and shows a cross sectional view along a plane that is perpendicular to the media facing surface MFS. FIG. 4 shows a tunnel junction sensor 316 located at the back edge (stripe height) of the spin torque oscillator 230. The structure of the tunnel junction sensor 316 can be similar to that described above, having a non-magnetic electrically insulating barrier layer 318, magnetic layer 320 and an electrically conductive lead 322. Again, the layer 322 is electrically insulated from the lead 222 by an electrically insulating layer 325. It should also be pointed out that, the tunnel junction sensor 316 formed at the back edge of the spin torque oscillator 230 can be in lieu of those formed at the sides as described above with reference to FIG. 3. Or, alternatively, the back edge tunnel junction sensor 316 can be in addition to those formed at the sides so as to form a tunnel junction sensor 316 that wraps around the sides and back edge of the spin torque oscillator.

The above described side formed tunnel junction sensors 316 provide a way of producing a strong signal for determining the frequency of the magnetic oscillation of the magnetizations 308, 314 produced by the spin torque oscillator 230. If a signal were measured across the spin torque oscillator 230 in a direction perpendicular to the planes of the layers 302, 304, 306 (essentially using the spin torque oscillator 230 as a giant magnetoresistive (GMR) sensor) the signal would be subtractive, with the signal resulting from oscillation 314 being subtracted from the signal resulting from oscillation 308. The resulting signal would, therefore, be very week and ineffective. On the other hand, using the side tunnel junction sensors 316, the signals from the magnetizations 308, 314 are additive rather than subtractive, resulting in a very strong effective signal.

The side tunnel junction sensors 316 can be used to determine the actual oscillation frequency of the spin torque oscillator 230 early in the manufacture process. In this way, if the frequency is not within a desired range, the head can be scrapped without unnecessary further manufacturing. In addition, the use of the side tunnel junction sensors 316 can be used to determine the oscillation frequency during manufacture, and the various manufactured heads can be grouped by oscillation frequency to be later matched up with magnetic media most suitable for use in that frequency range. This can further reduce waste by allowing the head use to be optimized while avoiding the need to scrap heads or entire magnetic recording systems.

Figure 5:
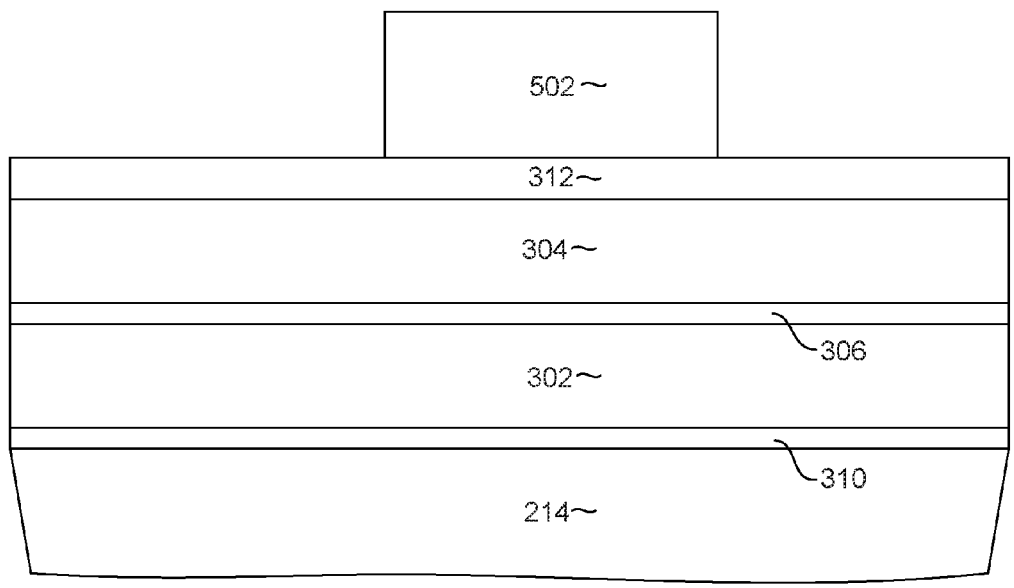
FIGS. 5-7 are views of a spin torque oscillator in various intermediate stages of manufacture illustrating a method of manufacturing a spin torque oscillator according to an embodiment.
Figure 6:
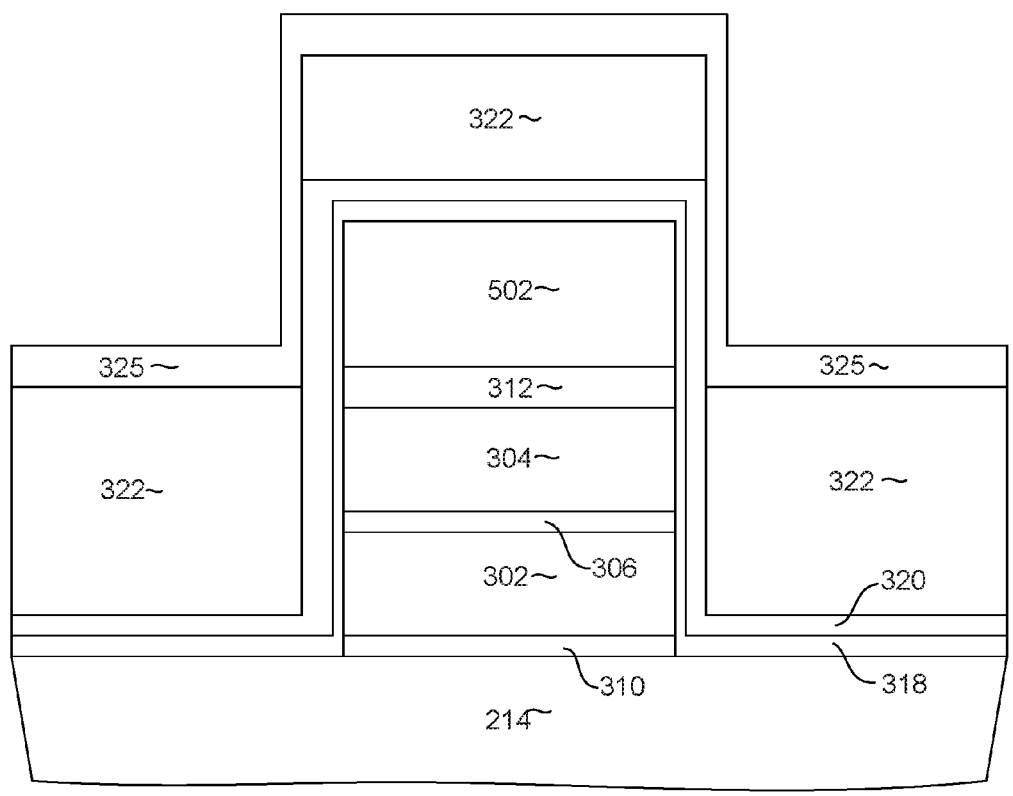
Figure 7:
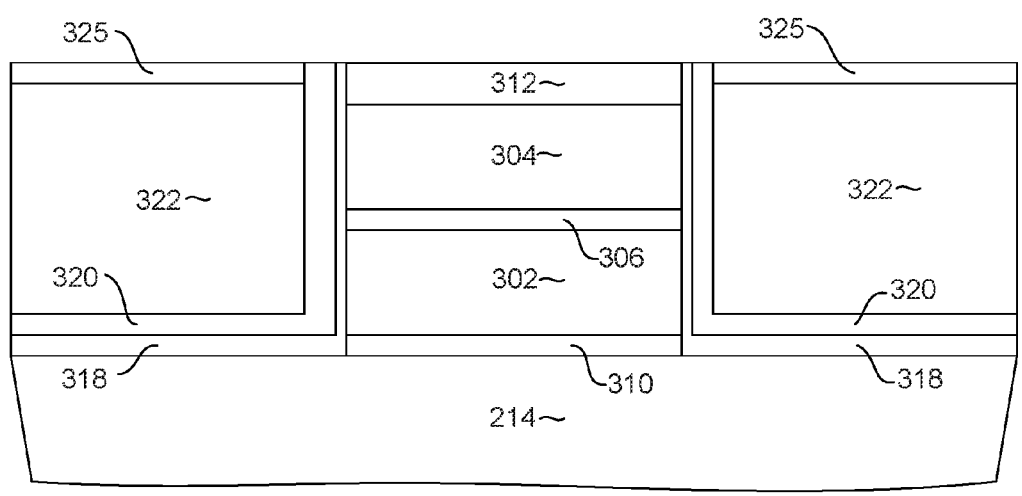

FIGS. 5-7 illustrate a magnetic spin torque oscillator in various intermediate stages of manufacture in order to illustrate a method of manufacturing a magnetic write head such as those described above. With reference to FIG. 5, the magnetic layers of the spin torque oscillator are deposited over the magnetic write pole 214. These layers can include: a seed layer 310; a first magnetic layer 302 deposited over the seed layer 310; a non-magnetic intermediate layer 306 deposited over the first magnetic layer 302; a second magnetic layer 304 deposited over the non-magnetic intermediate layer; and a capping layer 312 deposited over the second magnetic layer 304. A mask 502 is formed over these layers, the mask being configured to define a width and/or stripe height of the spin torque oscillator.

With reference to FIG. 6, a material removal process such as ion milling is performed to remove portions of the layers 310, 302, 306, 304, 312 that are not protected by the mask 502. A non-magnetic, electrically insulating barrier layer such as Mg—O 318 is then deposited. The barrier layer 318 is deposited in such a manner as to have a thickness at the sides of the layers 302, 306, 304 that allows it to function as a barrier layer and to be thicker over the write pole 214 so as to prevent current shunting through the write pole 214. Then, a magnetic layer 320 such as CoFeB is deposited over the barrier layer 318, and an electrically conductive lead 322 such as Cu or Au is deposited over the magnetic layer 320. An electrically insulating layer 325 is deposited over the lead material 322, and can be a material such as alumina. Then, with reference to FIG. 7, a mask lift-off process and/or chemical mechanical polishing is performed to remove the mask 502 (FIG. 6) and planarize the surface. The insulating layer 325 is deposited at a level and thickness such that it will remain after the mask removal and/or chemical mechanical polishing.

While various embodiments have been described above, it should be understood that they have been presented by way of example only and not limitation. Other embodiments falling within the scope of the invention may also become apparent to those skilled in the art. Thus, the breadth and scope of the inventions should not be limited by any of the above-described exemplary embodiments, but should be defined only in accordance with the following claims and their equivalents.

What is claimed is:

1. A magnetic write head, comprising:
   a spin torque oscillator having a leading edge, a trailing edge and a side extending from the leading edge to the trailing edge; and
   a magnetic sensor formed at the side of the spin torque oscillator.

2. The magnetic write head as in claim 1, wherein the spin torque oscillator further comprises a magnetic spin polarization layer, a magnetic field generation layer, and a non-magnetic interlayer located between the magnetic spin polarization layer and the magnetic field generation layer.

3. The magnetic write head as in claim 1, wherein the magnetic sensor includes a non-magnetic barrier layer, a magnetic layer and a non-magnetic electrically conductive lead.

4. The magnetic write head as in claim 1, wherein the magnetic sensor further includes a non-magnetic barrier layer formed on the side of the spin torque oscillator, a magnetic layer formed on the non-magnetic barrier layer, and a non-magnetic, electrically conductive lead, wherein the non-magnetic barrier layer is located between the magnetic layer and the spin torque oscillator and the magnetic layer is located between the lead and the non-magnetic barrier layer.

5. The magnetic write head as in claim 3, wherein the non-magnetic barrier layer comprises Mg—O, and the magnetic layer comprises Co—Fe—B.

6. The magnetic write head as in claim 3, wherein the non-magnetic, electrically conductive lead is connected with circuitry for measuring a change in electrical resistance of the non-magnetic barrier layer.

7. The magnetic write head as in claim 3, wherein the non-magnetic, electrically conductive lead is connected with circuitry for measuring a voltage across the non-magnetic barrier layer and the magnetic layer.

8. The magnetic write head as in claim 1, wherein the spin torque oscillator and the magnetic sensor are both located between a magnetic write pole and a trailing magnetic shield.

9. The magnetic write head as in claim 1, further comprising a second magnetic sensor located at a second side of the spin torque oscillator.

10. The magnetic write head as in claim 1, wherein the side of the spin torque oscillator is a stripe height defining side located opposite a media facing surface.

11. A magnetic data recording system, comprising:
    a housing;
    a magnetic media held within the housing;
    an actuator mounted within the housing;
    a slider connected with the actuator for movement adjacent to a surface of the magnetic media; and
    a magnetic recording head formed on the slider, the magnetic recording head including:
    a spin torque oscillator having a leading edge, a trailing edge and a side extending from the leading edge to the trailing edge; and
    a magnetic sensor formed at the side of the spin torque oscillator.

12. The magnetic data recording system as in claim 11, wherein the spin torque oscillator further comprises a magnetic spin polarization layer, a magnetic field generation layer, and a non-magnetic interlayer located between the magnetic spin polarization layer and the magnetic field generation layer.

13. The magnetic data recording system as in claim 12, wherein the magnetic sensor includes a non-magnetic barrier layer, a magnetic layer and a non-magnetic electrically conductive lead.

14. The magnetic data recording system as in claim 12, wherein the magnetic sensor further includes a non-magnetic barrier layer formed on the side of the spin torque oscillator, a magnetic layer formed on the non-magnetic barrier layer, and a non-magnetic, electrically conductive lead, wherein the non-magnetic barrier layer is located between the magnetic layer and the spin torque oscillator and the magnetic layer is located between the lead and the non-magnetic barrier layer.

15. The magnetic data recording system as in claim 14, wherein the non-magnetic barrier layer comprises Mg—O, and the magnetic layer comprises Co—Fe—B.

16. The magnetic data recording system as in claim 13, wherein the non-magnetic, electrically conductive lead is connected with circuitry for measuring a change in electrical resistance of the non-magnetic barrier layer.

17. The magnetic data recording system as in claim 13, wherein the non-magnetic, electrically conductive lead is connected with circuitry for measuring a voltage across the non-magnetic barrier layer and the magnetic layer.

18. The magnetic data recording system as in claim 12, wherein the spin torque oscillator and the magnetic sensor are both located between a magnetic write pole and a trailing magnetic shield.

19. The magnetic data recording system as in claim 12, further comprising a second magnetic sensor located at a second side of the spin torque oscillator.

20. The magnetic data recording system as in claim 12, wherein the side of the spin torque oscillator is a stripe height defining side located opposite a media facing surface.

* * * * *